US00RE37451B1

(19) United States
(12) Reissued Patent
Guridi

(10) Patent Number: US RE37,451 E
(45) Date of Reissued Patent: Nov. 20, 2001

(54) TABLE GAME

(75) Inventor: Jose Javier Silva Guridi, Houston, TX (US)

(73) Assignee: Unified Sciences Advancement, Inc. Totuma, Inc., Houston, TX (US)

(21) Appl. No.: 09/522,113

(22) Filed: Mar. 9, 2000

Related U.S. Patent Documents

Reissue of:
(64) Patent No.: 5,884,911
Issued: Mar. 23, 1999
Appl. No.: 09/020,263
Filed: Feb. 9, 1998

U.S. Applications:
(60) Provisional application No. 60/047,727, filed on May 27, 1997.

(51) Int. Cl.[7] ..... A63F 7/00
(52) U.S. Cl. ..... 273/119 R; 273/126 R; 273/129 R; 273/129 W; 273/109; 273/110
(58) Field of Search ..... 273/108, 109, 273/110, 118 R, 118 A, 119 R, 119 A, 121 R, 121 A, 123 R, 123 A, 126 R, 126 A, 129 R, 129 V, 129 W

(56) References Cited

U.S. PATENT DOCUMENTS

| | | | | |
|---|---|---|---|---|
| 1,934,381 | | 11/1933 | Slosson . | |
| 2,769,638 | | 11/1956 | Knapp . | |
| 3,061,312 | | 10/1962 | Glass et al. . | |
| 3,480,277 | | 11/1969 | Fraser . | |
| 3,574,350 | | 4/1971 | May . | |
| 3,977,675 | | 8/1976 | Leuthy, Jr. . | |
| 4,052,067 | * | 10/1977 | Carmo | 273/109 |
| 4,070,025 | * | 1/1978 | Wiser | 273/110 |
| 4,076,243 | * | 2/1978 | Davis | 273/110 X |
| 4,240,628 | * | 12/1980 | Brownfield | 273/110 X |
| 4,286,785 | | 9/1981 | Todokoro . | |
| 4,949,967 | | 8/1990 | Todokoro . | |
| 5,064,196 | * | 11/1991 | Gottlieb | 273/121 A |
| 5,516,102 | * | 5/1996 | Polk, III et al. | 273/119 R |
| 5,607,155 | * | 3/1997 | Campbell | 273/118 R X |

* cited by examiner

*Primary Examiner*—Raleigh W. Chiu
(74) *Attorney, Agent, or Firm*—Locke Liddell & Sapp LLP

(57) ABSTRACT

A table game including a housing, a playing surface received within the housing, and a paddle member resiliently affixed to the playing surface and supported by the housing. The paddle member serves to move the playing surface upwardly and downwardly relative to a vertical force applied to the paddle member. The paddle member is rotatable about a vertical axis relative to an actuation of a handle member connected thereto. The paddle member is slidable across a width dimension of the playing surface. The playing surface includes a first surface which is pivotally connected to a second surface. The first surface is independently movable relative to the second surface. A second paddle member is affixed to the second surface at an end of the first surface.

39 Claims, 8 Drawing Sheets

TABLE GAME

Matter enclosed in heavy brackets [ ] appears in the original patent but forms no part of this reissue specification; matter printed in italics indicates the additions made by reissue.

RELATED APPLICATIONS

The present utility patent application is based upon Provisional Patent Application Serial No. 60/047,727, filed on May 27, 1997, and entitled "TABLE GAME", presently pending.

TECHNICAL FIELD

The present invention relates to table games in which a sliding or rolling member is moved across the playing surface of the game. More particularly, the present invention relates to such table games which use paddles so as to provide the propulsive force to the puck member.

BACKGROUND ART

Games in which a light ball is used are known. In one case, the propelling force applied to the ball is created by a player blowing on the ball so as to cause it to travel it in a desired path. In other cases, bats or paddles are used which are suspended from rotary rods that are axially slidable. These rods are provided with radial arms so that animated players manipulate the rotary rods to bring the bat or paddle into engagement with the ball. On the rotation of the bat, a ball engaged thereby is caused to travel to and fro on the table and across the surface or close to the surface thereof. Each player endeavors so as to cause the ball to move in a direction toward the opponent's goal.

In the past, various patents have issued on devices relating to moving a ball across the surface of a table game.

U.S. Pat. No. 3,061,312 teaches a game with a hinged split surface for manipulating a ball back and forth. Pressure is applied to the surfaces so as to allow the surfaces to pivot with respect to one another. A transparent dome or shell 41 extends over the top of the board so as to prevent loss of the ball. The movement of the ball is controlled by a pair of control buttons which are supported on control boxes located outside of the split surface.

U.S. Pat. No. 4,949,967 teaches a game where two inclined surfaces direct a ball back and forth onto propellers/blockers that can be moved from side to side. It does not appear that the board is suitable for being manipulated upwardly or downwardly. The board simply has an incline that assures that the ball will roll from one end to the other upon propulsion by the propeller/blocker members.

U.S. Pat. No. 4,286,785 teaches a game board with two sliding blocker/propellers for passing the ball over a surface with two inclined portions. Once again, the surface is not manipulatable so as to allow for the desired propulsive movement of the ball.

U.S. Pat. No. 3,480,277 teaches a table football game which includes a plurality of rotatable bars extending transversely across a longitudinal axis of a game board. The surface of the game is inclined so that a low point is realized in the center of the board. Handles are provided on each of the bars so as to allow for rotation for the purpose of "launching" the ball toward a goal located at the respective ends of the game board.

U.S. Pat. No. 3,574,350 describes a hockey game apparatus which includes an open box containing a playing field for a puck. A series of parallel spaced apart transverse handles are placed over the playing field. Each handle is axially slidable and pivotable and has sideward extending paddles for striking the puck toward either of an opposing goal puck at each opposite end of the playing field.

U.S. Pat. No. 3,977,675 describes a paddle game apparatus that is provided within a rectangular box. This rectangular box defines a playing area. The playing area has transverse barrier walls of less height than its side and end walls. These transverse barrier walls are spaced from each end wall so as to define goal areas and each barrier wall has an opening to define a scoring pad. Slidable and rotatable paddle-carrying rods extend through the side walls between the barrier walls. The paddles are dimensioned so that a ball may be projected through the opening into a goal area.

U.S. Pat. No. 1,934,381 teaches a table game which has a box-like enclosure with a playing surface of convoluted form positioned thereon. A plurality of bars extend across the playing surface. These bars are manipulatable with handles so as to project a ball from end to end across the playing surface.

U.S. Pat. No. 2,769,638 teaches a simulated hockey game board in which a pair of inclined surfaces are located at opposite ends of the game board. A plurality of propulsion members are located between the center of the board and the net at the end of the board. A spring-like device is provided in the center of the board so as to start the game. The board does not have the capability of being moved upwardly or downwardly in a pivotal manner.

It is an object of the present invention to provide a table game in which the handles and paddles serve to rotate, slide, and change the angle of the playing surface.

It is another object of the present invention to provide a table game which provides greater amusement by the manipulation of the table surface.

A further object of the present invention is to provide a table game which assures continuous action without the need for electrical or pneumatic apparatus.

It is still a further object of the present invention to provide a table game in which the paddle member actually provides three dimensions of action during the propulsion of the puck member.

It is still a further object of the present invention to provide a table game which is easy to use, easy to understand, easy to manufacture, and relatively inexpensive.

These and other objects and advantages of the present invention will become apparent from a reading of the attached specification and appended claims.

SUMMARY OF THE INVENTION

The present invention is a table game that comprises a housing, a playing surface received within the housing, and a paddle means affixed to the playing surface and supported by the housing. The paddle means serves to move the playing surface upwardly and downwardly relative to a vertical force applied to the paddle means. The paddle means is rotatable about the vertical axis relative to an actuation of a handle member connected thereto. The paddle means is resiliently supported in the housing such that the playing surface is urged to a horizontal orientation when a vertical force is not applied.

The playing surface includes a first surface and a second surface which is pivotally connected to the first surface. The paddle means serves to move the first surface independent of the second surface. The paddle means is positioned at one end of the first surface opposite the second surface. A second paddle means is affixed to the second surface and at end opposite the first surface. The second paddle means is resiliently supported by the housing. The second paddle means serves to pivot the second surface relative to the first surface during the application of a vertical force to the second paddle means.

The paddle means includes a frame which is affixed to an end of the playing surface and extends above the top surface, a bar extending across the frame, a paddle member, a vertical member connected to the paddle member and resiliently and slidably connected to the bar, and a handle member affixed to the vertical member. The frame is connected to the housing by a spring. This spring serves to allow the playing surface to move relative to a downward force applied to the handle member. The bar extends between the sides of the housing. The housing has a guide slot formed therein such that the bar extends through the guide slot and moves through the guide slot during the pivotal movement of the playing surface. In particular, the bar includes a first bar which extends in generally parallel relationship to the playing surface, and a second bar in coplanar parallel relationship to the first bar. The vertical member extends between the first and second bars. In particular, the vertical member is retained by a support receptacle slidably affixed to the first and second bars. The support receptacle rotatably receives the vertical member therein. A stop member is affixed to one of the first and second bars so as to limit a slide travel of the support member across the first and second bars.

In the present invention, a puck member is slidably and removably positioned on the top surface of the playing surface. The paddle member supports a first paddle which extends upwardly transverse to the top surface and a second paddle extending upwardly transverse to the top surface. The first and second paddles are in coplanar alignment. The first and second paddles have a space therebetween greater than the diameter dimension of the puck member.

DETAILED DESCRIPTION OF THE INVENTION

Figure 1:
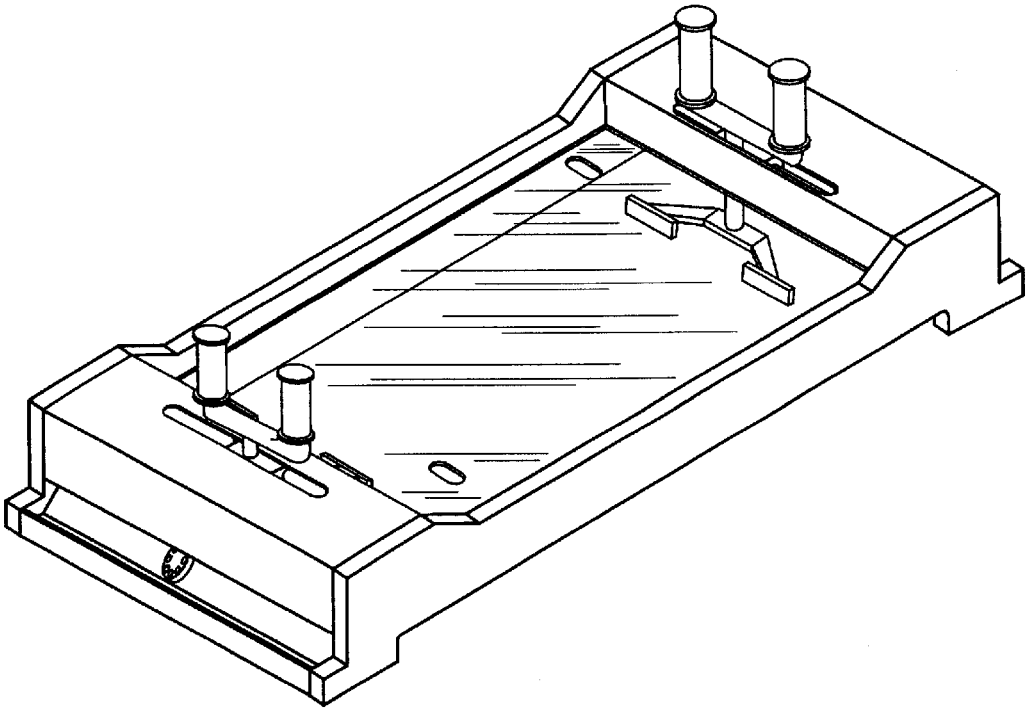
FIG. 1 is a perspective view of the preferred embodiment of the present invention.

Referring to FIG. 1, there is shown at 10 the table game in accordance with the preferred embodiment of the present invention. The table game 10 includes a housing 12 having a playing surface 14 received therein. A first paddle member 16 is affixed to the playing surface 14 and supported by the housing 12. A second paddle member 18 is also affixed to the playing surface 14 and supported by the housing 12. Each of the paddle members 16 and 18 serves to move the playing surface 14 upwardly, downwardly and angularly relative to a vertical force applied to the paddle members 16 and 18, respectively. The first paddle member 16 includes paddles 20 and 22 that are connected to a vertical member 24. The rotation of the handles 26 of the first paddle member 16 serves to cause the paddles 20 and 22 to rotate relative thereto. The second paddle member 18 has a similar configuration.

The playing surface 14 has a generally flat top surface. As will be described hereinafter, the playing surface 14 is pivotal such that the actuation of the paddle members 16 and 18 will cause the playing surface 14 to move angularly upwardly and downwardly. In FIG. 1, it can be seen that a slot 30 is provided so as to allow for the insertion of a puck member 32 during play. The puck member 32 is shown in a trough 34 at the end 36 of the housing 12. The puck member 32 has a plurality of protruding bearings formed therein. These bearings allow the puck member 32 to travel freely and easily on the top surface of the playing surface 14. Alternatively, in the present invention, the puck member 32 can be a ball which rolls along the top surface of the playing surface 14. An alternative slot 38 can be provided on a side wall 40 of the housing 12 so as to allow the puck to be inserted through the side wall.

In FIG. 1, it can be seen that the paddle member 16 has a first handle member 26 and a second handle member 42 extending upwardly vertically from a crossbar 44. The crossbar 44 is affixed to the vertical member 24. The vertical member 24 extends through a guide slot 46 in the top surface 48 of the housing 12. As such, the vertical member 24 can slide in the slot 46 relative to a side-to-side motion imparted upon the handle members 26 and 42 of the paddle member 16.

The paddle member 16 includes a pair of paddles 20 and 22. Each of the paddles 20 and 22 extends vertically upwardly generally transverse to the top surface of the playing surface 14. The surface of the paddles 20 and 22 is generally flat. Each of the paddles 20 and 22 is spaced from each other by a distance greater than the diameter of the puck member 32.

In FIG. 1, it can be seen that the second paddle member 18 extends through a guide slot 50 formed in the opposite end of the housing 12. The second paddle member 18 will have a similar configuration as the first paddle member 16. The paddles 52 and 54 of the second paddle member 18 face the paddles 20 and 22 of the first paddle member 16. As such, each of the paddle members are in a suitable position for propelling the puck member 32 to and fro.

Legs 56 and 58 serve to support the housing 12 above a surface.

Figure 2:
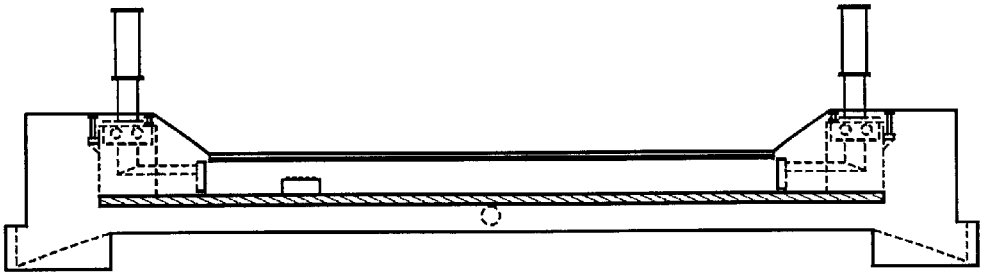
FIG. 2 is a cross-sectional side view of the table game of the present invention.

FIG. 2 illustrates the operation and construction of the table game 10 of the present invention. Initially, it can be seen that a frame 60 is affixed to the top surface 62 of the playing surface 14. Frame 60 is affixed to one end of the playing surface 14. A pivot point 64 is formed centrally along the playing surface 14 so as to divide the playing surface 14 into a first playing surface 66 and a second playing surface 68.

The first paddle member 16 has its handle 42 extending upwardly vertically through the guide slot 46 in the housing 12. It can be seen that the frame 60 is connected to the top surface 48 of the housing 12 through the use of spring elements 70 and 72. The paddle 20 is illustrated as standing in a plane transverse to the plane of the playing surface 62. The second paddle member 18 has an identical configuration as the first paddle member 16, but faces in an opposite direction. The puck member 32 is illustrated as positioned on the top surface 62 of the playing surface 14. Another frame 74 is affixed to an opposite end of the playing surface 14 from the frame 60. The frame 74 is also supported by spring element 76.

Figure 3:
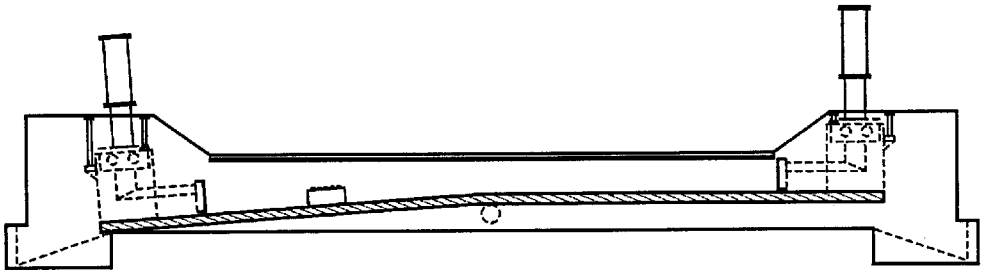
FIG. 3 is a cross-sectional side view of the table game of the present invention showing the paddle member as pivotting the playing surface.

FIG. 3 shows an operation of the playing surface 14. It can be seen that a downward force 78 is applied to the handle of the second paddle member 18. This causes the second surface 68 of the playing surface 14 to pivot at hinge point 64 relative to the first surface 62. It can be seen that the spring elements 76 are extended by the downward force 78. The spring elements 76 serve to urge the playing surface 68 into a horizontal orientation when the force 78 is not applied to the second paddle member 18. Although the second surface 68 has been pivotted with respect to the first surface 62, the first surface 62 remains in its horizontal orientation. The downward incline of the second surface 68 causes the puck 32 to move toward the paddle 52. As such, the person using the second paddle 18 will receive the puck 32 and can, thereby, project the puck 32 toward the opposite end of the housing 12.

Within the concept of the present invention, it should be noted that the puck member 32 can be any type of object which is suitable for sliding along the top surface of the playing surface 14. For example, the puck member 32 can be a flat puck, can be a puck with bearings, can be a ball, or can be any other object which effectively moves along the surface 14. The spring elements 76 and 72 can be various types of resilient items, such as rubber bands, compression springs, bungie cords, and related items.

Figure 4:
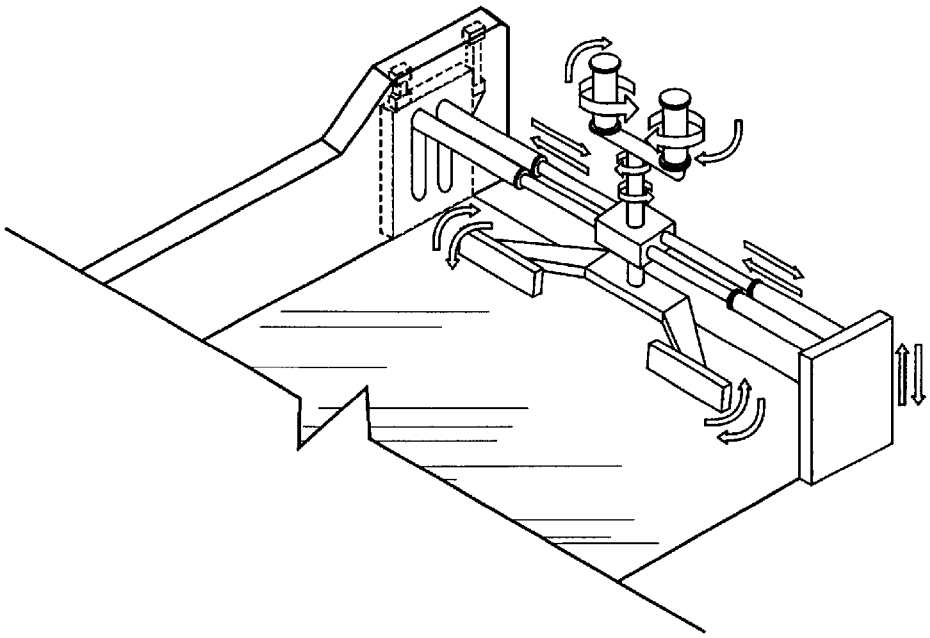
FIG. 4 is an isolated perspective view of the action of the paddle member.

FIG. 4 is a detailed view showing the first paddle member 16 and its construction within the housing 12 and relative to the playing surface 14. Initially, it can be seen that the frame 60 is affixed to the playing surface 14. The frame 60 has one portion connected to one side 80 at the playing surface. Another frame portion 60 is connected to an opposite side 82 of the playing surface 14. The frame 60 is mounted within the interior of the housing 12. Guide slots 84 are provided in an inner wall 86 of the housing 12 so as to control the vertical upward and downward movement of the playing surface 14 and the paddle member 16. It can be seen that the paddles 20 and 22 can rotate back and forth relative to the rotation of the vertical member 24. This rotation is accomplished by rotating the handles 26 and 42 relative to each other. The rotation of the handles 26 and 42 causes the crossbar 44 to rotate which, in turn, causes the vertical member 24 to rotate. The vertical member 24 is received by a support receptacle 88 so as to facilitate the rotation of the vertical member 24. The support receptacle 88 is slidably affixed to bars 90 and 92. Bars 90 and 92 extend between the sides of the frame 60. Bars 90 and 92 are arranged in generally parallel relationship to the top surface of the playing surface 14. The bars 90 and 92 are arranged in co-planar parallel relationship to each other. The bars 90 and 92 serve to cause the downward force applied to the handles 26 and 42 to be imparted on the frame 16 which causes the downward deflection and pivoting of the first playing surface 62 relative to the second playing surface 68. A stop member 94 is applied to at least one of the bars 90 and 92 so as to limit the side-to-side travel of the vertical member 24 and the support receptacle 88. This prevents the paddles 20 and 22 from adversely contacting the side walls 86 of the housing 12.

In FIG. 4, it can be seen that the mechanism for the operation of the paddles 20 and 22 allows for three-dimensions of movement. The paddles 20 and 22 can be rotated so as to propel the ball. The handles can cause the paddles 20 and 22 to move from side to side so as to provide defense against the puck passing through the area between the paddles 20 and 22. Finally, the first surface 62 of the playing surface 14 can be deflected downwardly and angularly so as cause the ball to roll towards the paddles 20 and 22.

Figure 5:
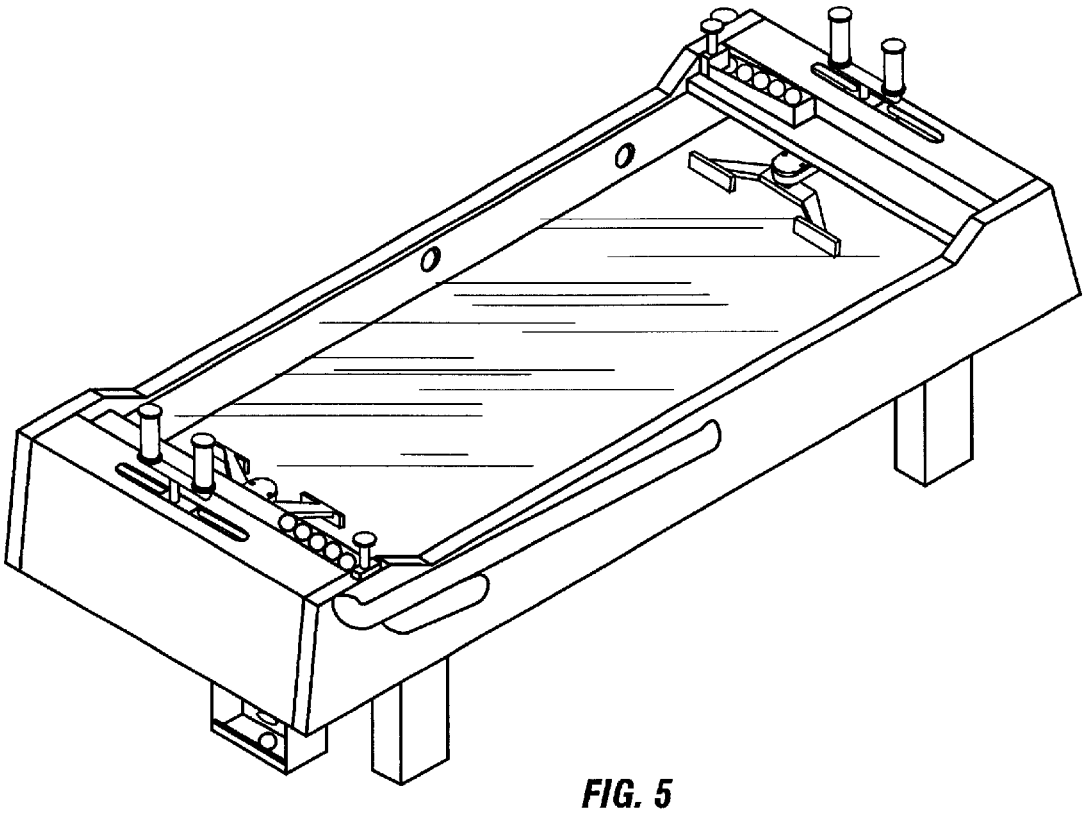
FIG. 5 is a perspective view of an alternative embodiment of the table game of the present invention.

FIG. 5 shows an alternative embodiment 100 of the table game of the present invention. In this embodiment of the present invention, the housing 102 also receives the playing surface 104 therein. The alternative embodiment 100 utilizes balls 106 as the element for rolling along the playing surface 104 between the paddles 108 and 110. It can be seen that the balls 106 are retained within the ball rack 112. During the playing of the game, the first person to run out of balls within their respective ball rack is the winner of the game.

In this alternative embodiment 100, the handles 114 are connected by a transmission device 120 to the paddles 108. The transmission device 120 is a belt or sprocket driven device which causes the paddles 108 to rotate more quickly or less quickly relative to the rotation of the handles 114. A detailed description of the transmission device is provided hereinafter.

In the embodiment 100, a tube 122 is provided so as to allow one of the balls 106 to be introduced into the center of the playing surface 104. A hole 124 is provided in a side wall of the housing 102 so as to allow the ball to be delivered to the center of the playing surface from the tube 122. A striker 126 is provided so as to allow the person to properly serve the ball. An alternative tube 128 can be provided when it is desired that the loser serve his or her ball directly onto the paddles 110. A similar arrangement of tubes, and other items, is provided for each side of the game 100. For example, hole 130 is provided so as to allow the introduction of balls from tube 128 on the opposite side of the housing 102. A ball return pocket 132 receives balls from the opposite end of the playing surface 104 so that the ball returns to the player that made the goal. Legs 134 serve to support the playing surface 104 and the enclosure 102 above the floor.

Figure 6:
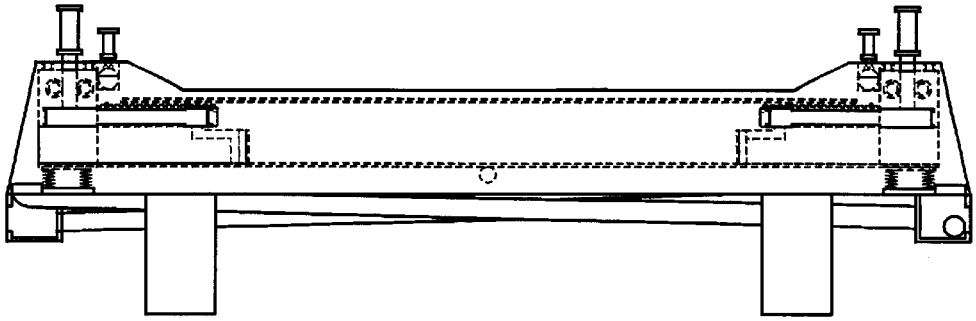
FIG. 6 is a cross-sectional side view of the table game in accordance with the alternative embodiment of the present invention.

FIG. 6 illustrates the operation of the table game 100. In particular, it can be seen that the playing surface 104 has a first surface 140 and a second surface 142. Springs 144 are interposed between the bottom of the first surface 142 and the floor 146 of the housing 102. Similarly, springs 148 are interposed between the bottom of the second surface 140 and the floor 146. The springs 144 and 148 serve to facilitate the action of the spring elements at the top of the frame. FIG. 6 also shows the ball return tubes 150 and 152 which allow for the return of a ball 154 into a pocket 156 as it passes into a trough 158 at the opposite end of the playing surface 104. The return tube 150 will function in a similar manner relative to the receipt of a ball by trough 160.

Figure 7:
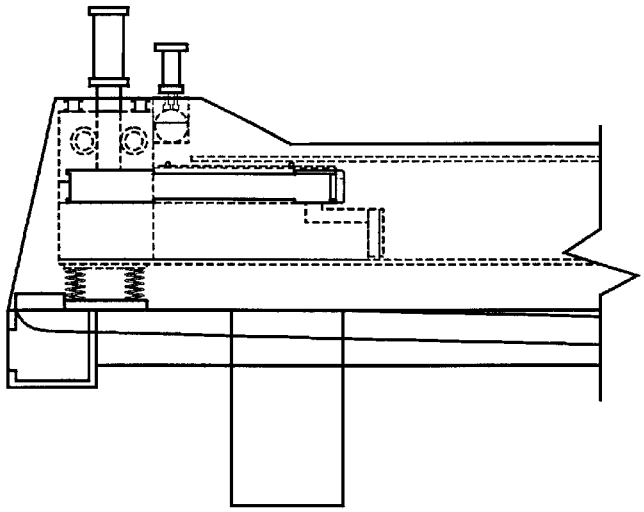
FIG. 7 is an isolated detailed view of the paddle member as used in this alternative embodiment.

FIG. 7 is a detailed view of the operation of the transmission mechanism 120. It can be seen that a belt 162 extends between the vertical member 162 of handle 164 and a sprocket or gear associated with the paddle 110. As such, when the handles 164 are rotated, the gear ratio between the gear 166 associated with the paddle 110 and the gear 168 associated with the vertical member 162 will either enhance or reduce the propulsive effect of the paddle 110.

Figure 8:
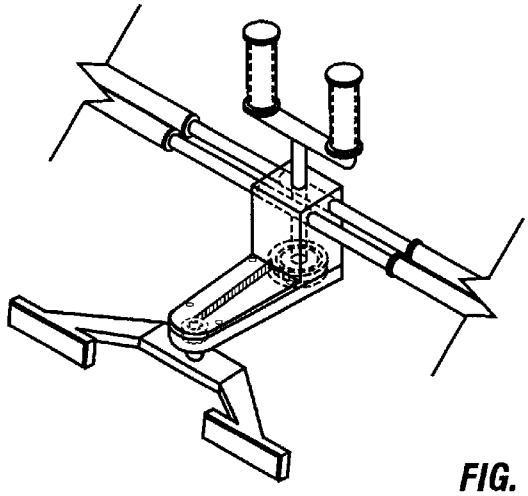
FIG. 8 is an isolated see-through view of the operation of the paddle member of this alternative embodiment.

FIG. 8 shows a similar arrangement as associated with the handles 114 at the opposite end of the playing surface 104. It can be seen that the handles 114 are connected to a vertical member 170. Vertical member 170 extends through the receptacle support 172 so as to be connected to a sprocket 174. Sprocket 174 includes a belt or chain 176. Belt 176 is received by sprocket 178 associated with a vertical member 180 that is connected to the paddles 108. It can be seen that a rapid movement of the handles 114 will cause a more rapid rotation of the paddles 108 by virtue of the gear ratio between the sprocket 174 and the sprocket 178.

Figure 9:
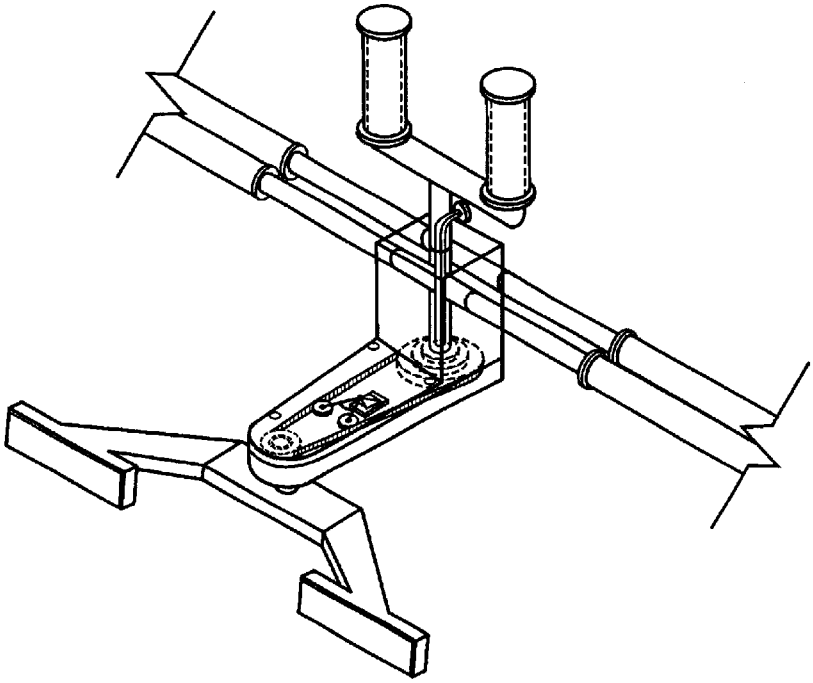
FIG. 9 is an alternative variation of the construction of the paddle member of this alternative embodiment.

FIG. 9 shows an alternative arrangement associated with handles 114 for the transmission of rotation speed from the handles 114 to the paddles 108. As before, the handles 114 are associated with a sprocket 184. Paddles 108 are associated with a sprocket 186. A belt or chain 188 extends between sprocket 184 and sprocket 186. Tension wheels 190 and 192 act on the belt 188 so as to pick up the slack on the belt 188. A lever 194 is associated with the sprocket 184 so as to allow the belt 188 to be adjusted among the various gears found on the sprocket 184. As such, the speed and action of the paddles 108 can be easily adjusted relative to the rotation of the handles 114.

Figure 10:
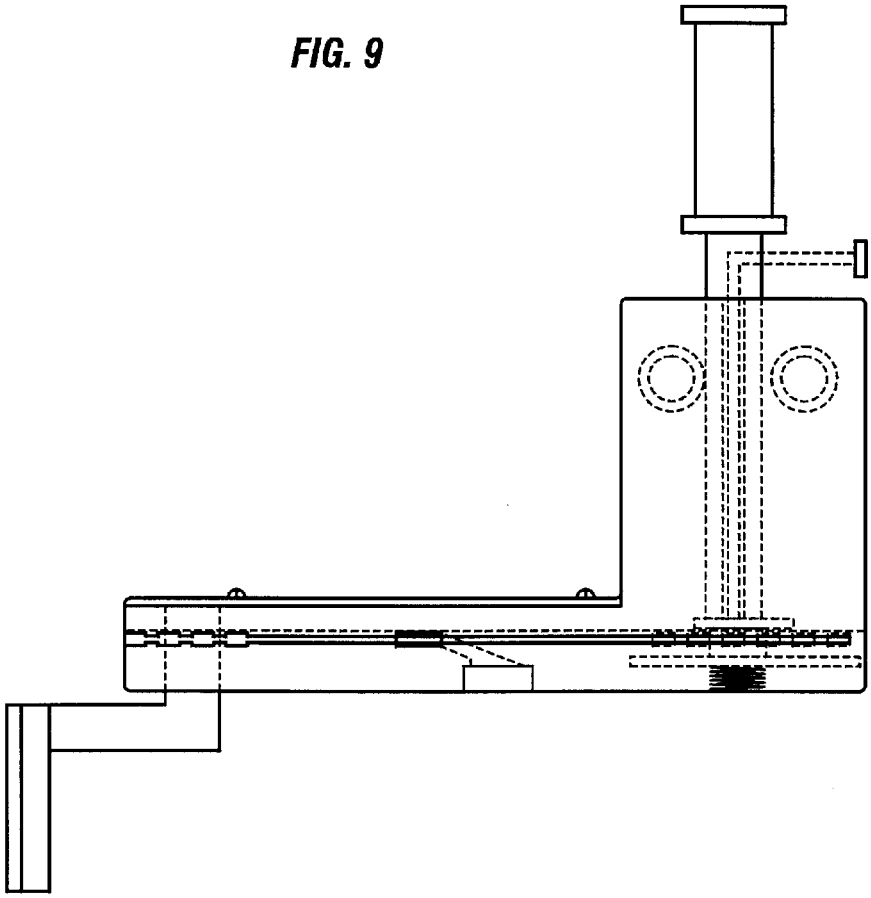
FIG. 10 is a cross-sectional view showing the variation of the paddle member of the alternative embodiment.

FIG. 10 shows a more detailed view of the arrangement of FIG. 9. It can be seen that the lever 194 extends outwardly of the handle 114 and is supported between bars 200 and 202. Lever 194 is depressed so that it will compress the spring 204 so as to allow the belt 188 to align with the desired gear on the sprocket 184. The tension wheels 190 and 192 are arranged so as to pick up the slack when the belt 184 moves from the larger diameter gear on sprocket 184 to a smaller diameter gear. This arrangement of gears on the sprocket 184 in association with the belt 188 and the sprocket 186 allows the player to adjust the level of difficulty of the game to the desired level.

Figure 11:
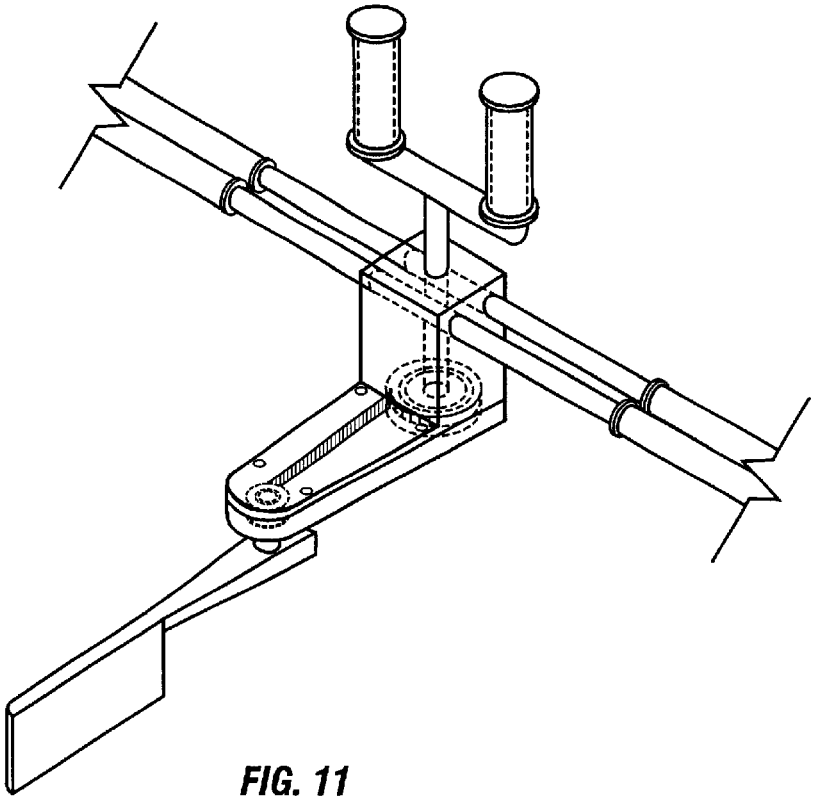
FIG. 11 is a perspective view see-through view of a second alternative embodiment of the paddle member of the present invention.
Figure 12:
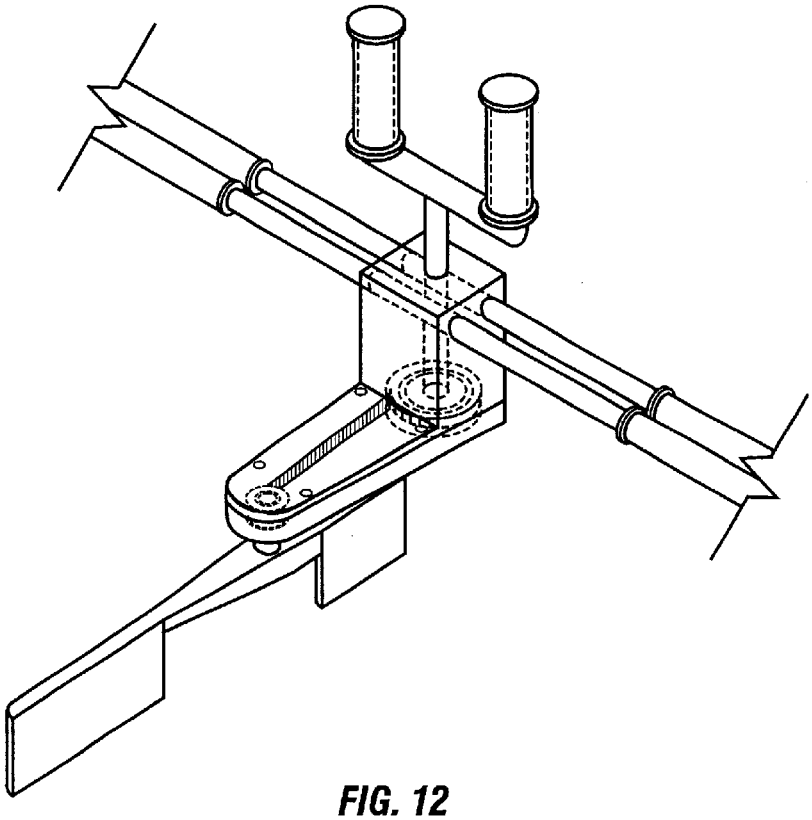
FIG. 12 is a perspective view see-through view of a third alternative embodiment of the paddle member of the present invention.

FIGS. 11 and 12 show alternative arrangements of the configuration of the game of the present invention. In FIG. 11, the embodiment 300 shows handles 302 which are supported on bars 304 and 306. The paddle 308 extends outwardly transversely relative to the direction of the bars 304 and 306. Transmission device 310 serves to impart rotation from the handle 302 so as to cause a "flipping" action of the paddle 308. The arrangement in FIG. 11 can be utilized whenever it is desired to have play along the sides of the game. This can be utilized, for example, if the game is designed for use in doubles.

FIG. 12 shows a similar embodiment as embodiment 300 of FIG. 11. Embodiment 400, as shown in FIG. 12, utilizes a first paddle 402 and a second paddle 404. The short back paddle 404 can be utilized for balance, blocks and for special skill shots.

Figure 13:
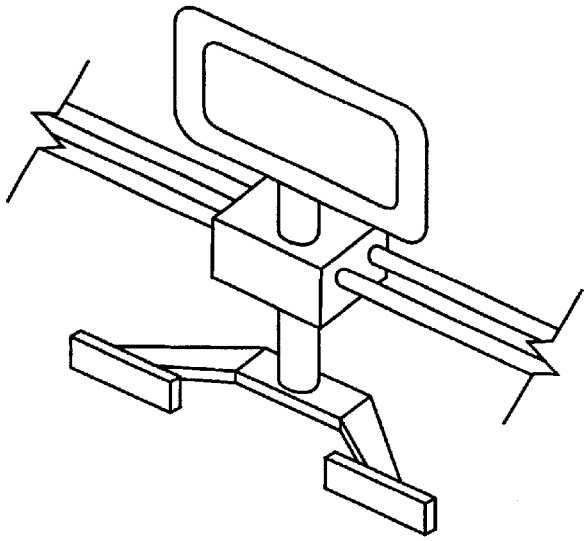
FIG. 13 is a perspective view showing an alternative embodiment of the handle as used with the paddle member of the present invention.

FIG. 13 illustrates a handle 500 which is configured for safety. It can be seen that handle 500 has a generally rectangular shape. The handle 500 is connected to the vertical member 502. The handle 500 has vertical portions 504 and 506. Horizontal section 508 extends between the vertical sections 504 and 506 so as to prevent injury if a person accidentally falls on top of the handle 500.

Figure 14:
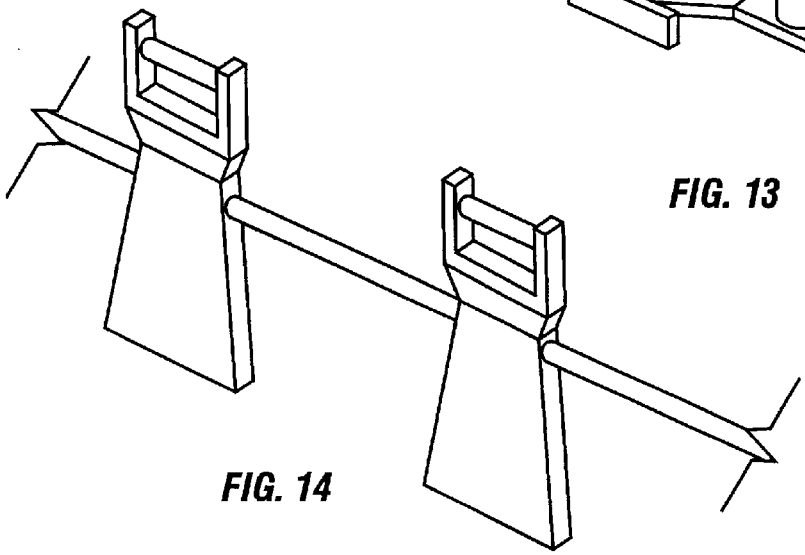
FIG. 14 is an alternative view of the paddle member of the present invention.

FIG. 14 shows another variation on the present invention in which a pair of paddles 600 and 602 can be utilized and supported on the bar 604. Each of the paddles 600 and 602 has an identical configuration. A gripping portion 606 is provided on the paddle 600. A gripping portion 608 is provided on the paddle 602. One of the paddles 600 and 602 can be received by one hand while the other paddle is received by the other hand.

Figure 15:
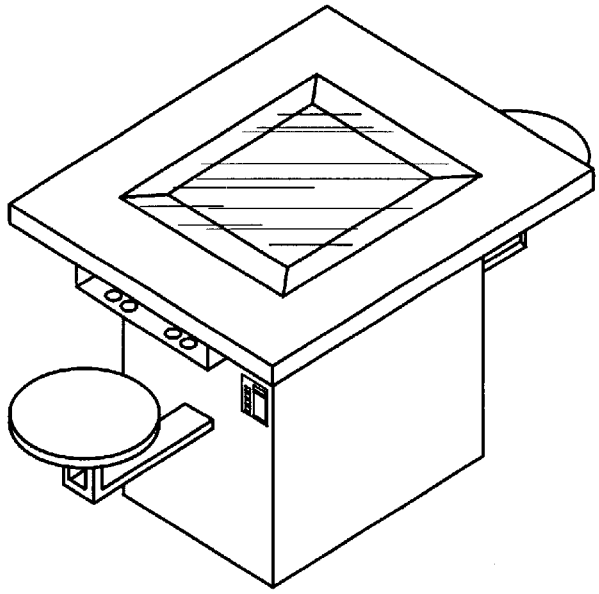
FIG. 15 is a perspective view showing the table game of the present invention as incorporated within a video game console.

FIG. 15 illustrates the present invention as an arcade video unit 700. In this fashion, the person can play against a machine or against another player.

Figure 16:
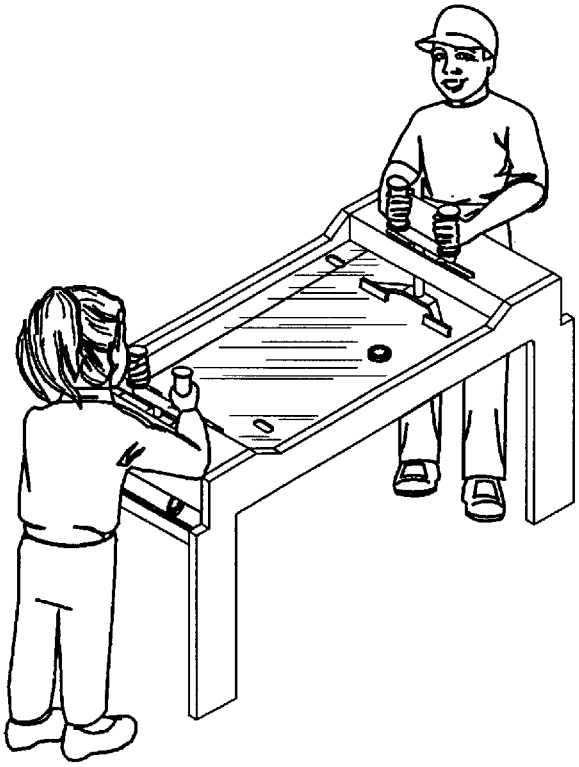
FIG. 16 is a perspective view of the present invention as shown in operation.

FIG. 16 shows the present invention 10 as being played by individuals 800 and 802. The individual 800 is gripping the first paddle 16 at one end of the housing 12. The second individual 802 is gripping the handles 18 at the opposite end of the housing 12. As can be seen, the puck 32 is propelled by rotating the handles on the paddle member 16 so as to cause the paddle 20 to propel the puck 32 in the direction of the second individual 802.

Figure 17:
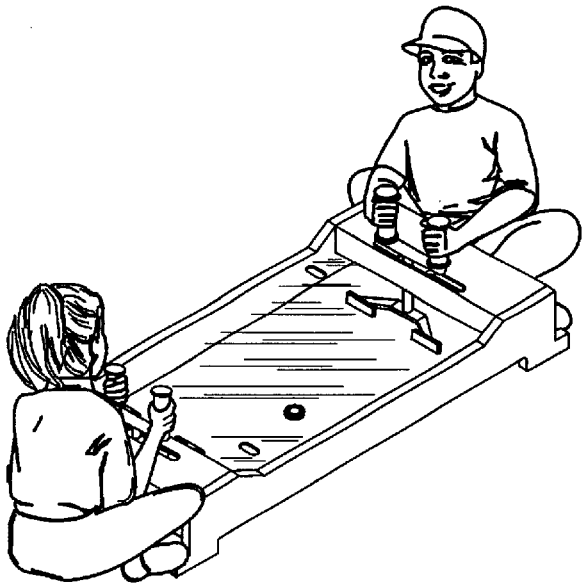
FIG. 17 is another view of the present invention as shown in operation.

FIG. 17 shows a similar arrangement with the table game 10 of the present invention as applied for playing on the floor.

Figure 18:
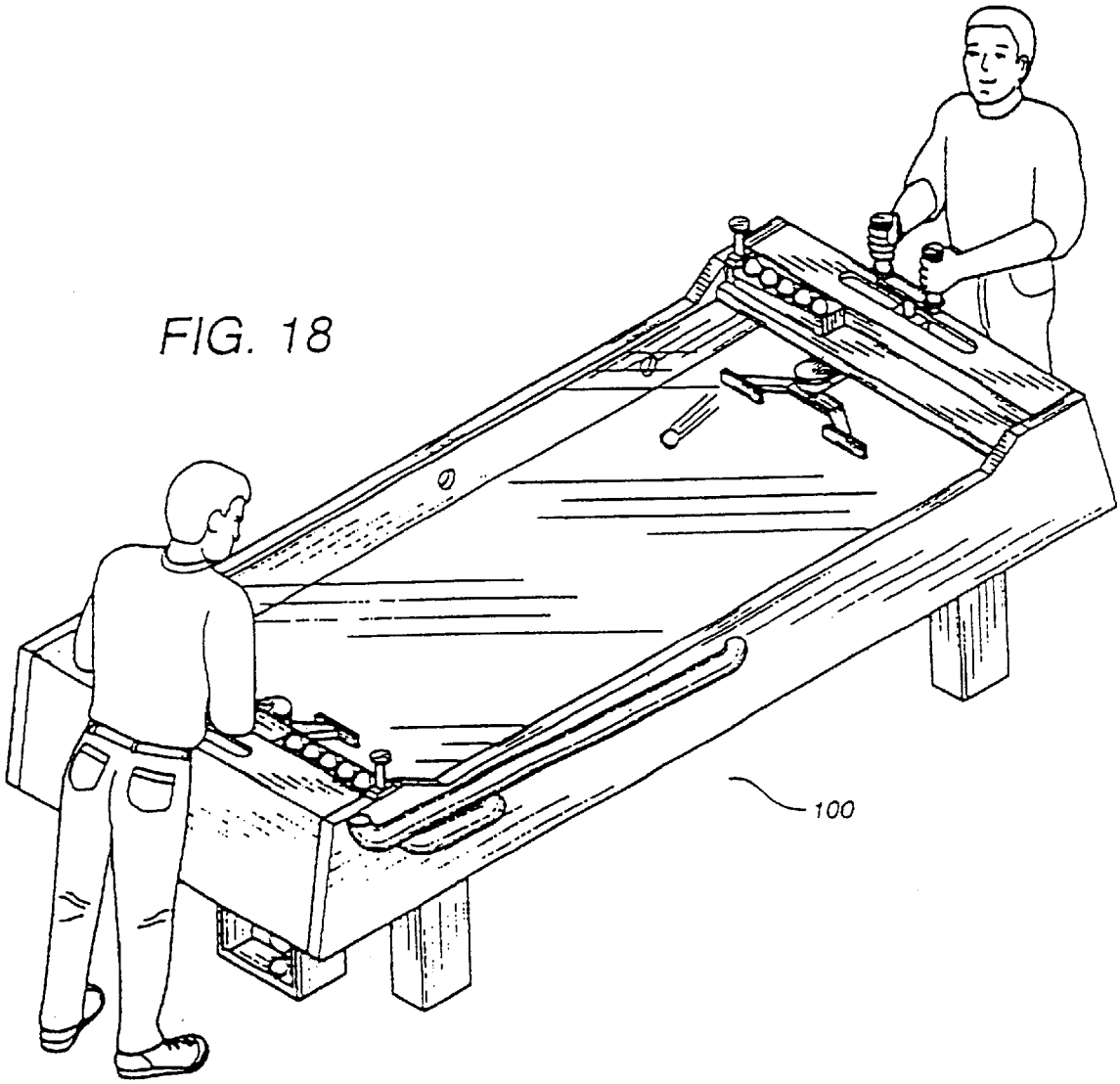
FIG. 18 is a perspective view showing the operation of the alternative embodiment of the present invention.

FIG. 18 shows embodiment 100 of the present invention in its actual form for playing.

The present invention is a significant and enjoyable improvement over prior table games in which a puck is propelled from one side of the table to the other. In the present invention, various variations can be made without departing from the spirit of the invention. For example, the playing surface can be arranged in a fixed incline. An electromagnetic floor can be provided so as to lower friction acting on the ball or puck. This can be arranged such that the ball or puck floats above the playing surface by magnetic or pneumatic force. The side interior walls of the housing can be formed of a membrane so as to allow for a desired bounce during bank shots. The interior of the housing of the present invention can include built-in water tanks so as to weigh the unit down when in use. This prevents the table from moving during play. A tennis-type mesh can be applied to the paddles in place of the solid striking surface. The table can have an octagonal, oval, round or other configuration. A net can be provided over the top surface of the housing instead of glass. The strike surface of the paddle can be curved, flat, rippled, or of other forms.

The present invention also contemplates a double-sized table with four paddles which allow four people to play. This table can contain a partition wall that can be raised with a lever so as to convert the table into two regular tables. The present invention contemplates the ability for one player to control his side of the floor by pushing down but he can also push only on one side of the paddle so as to twist the floor in either direction so that he can direct the ball to the left or right paddle. It is not required that the table move in an even fashion up or down.

There are many configurations of rods or bars that can be used to mount the paddles. For example, one round rod can be used instead of the aforedescribed two bars. One rectangular or other shaped rod can act as a rail so as to prevent the paddle from swinging back and forth while still allowing lateral movement. More than one round rod, i.e. four rods for maximum support of the paddle can be used so as to minimize back and forth movement.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A table game comprising:

a housing;

a playing surface received within said housing; and a paddle means affixed to said playing surface and resiliently supported by said housing, said paddle means for moving said playing surface upwardly and downwardly relative to a vertical force applied to said paddle means, said paddle means rotatable about a vertical axis.

2. The table game of claim 1, said paddle means being resiliently supported by said housing such that said playing surface is urged to a horizontal orientation when vertical force is not applied to said paddle means.

3. The table game of claim 1, said playing surface comprising:

a first surface; and a second surface pivotally connected to said first surface, said paddle means for moving said first surface independently of said second surface.

4. The table game of claim 3, said paddle means positioned at an end of said first surface opposite said second surface.

5. The table game of claim 4, further comprising:

a second paddle means affixed to said second surface at an end opposite said first surface, said second paddle means being resiliently supported by said housing, said second paddle means for pivoting said second surface relative to said first surface by applying a vertical force to said second paddle means.

6. The table game of claim 3, said playing surface having a length dimension and a width dimension, said first surface having an area generally equal to an area of said second surface, the pivotal connection extending across said width dimension in a direction transverse to said length dimension.

7. The table game of claim 1, said playing surface having a length dimension and a width dimension, said paddle means for slidably moving across at least a portion of said width dimension in a direction transverse to said length dimension.

8. [The table game of claim 1, said playing surface having a generally flat top surface,] *A table game, comprising:*

*a housing;*

*a playing surface received within said housing; and*

*a paddle mechanism disposed within said housing,* said paddle [means] *mechanism,* comprising:

a frame [affixed to] *positioned at* an end of said playing surface and extending above said [top] *playing* surface;

[a] *at least one* bar extending across said frame;

a paddle member;

a vertical member connected to said paddle member and rotatably and slidably connected to said bar *to permit said paddle member to rotate about an axis generally perpendicular to said playing surface while moving across said playing surface;* and a handle member affixed to said vertical member.

9. The table game of claim 8, said frame being connected to said housing by a spring means, said spring means for allowing said playing surface to move relative to a downward force applied to said handle member.

10. The table game of claim 9, said spring means comprising:

a first spring element having an end affixed to a surface of said frame and another end affixed on one side of said housing; and a second spring element having an end affixed to another surface of said frame and another end affixed to said housing on an opposite side of said housing.

11. The table game of claim 10, said bar extending between said sides of said housing, said housing having a guide slot formed therein, said bar extending through said guide slot.

12. The table game of claim 9, said spring means comprising:

a compression spring interposed between a bottom of said playing surface and a surface of said housing.

13. The table game of claim 8, said bar comprising:

a first bar extending in generally parallel relationship to said playing surface; and a second bar in coplanar relationship to said first bar, said vertical member extending between said first and second bars.

14. The table game of claim 13, further comprising:

a support receptacle slidably affixed to said first and second bars, said support receptacle rotatably receiving said vertical member therein; and a stop member affixed to at least one of said first and second bars for limiting [a] slide travel of said support member along said first and second bars.

15. The table game of claim 8, further comprising:

a [puck member] *game piece* slidably and removably positioned on said [top] *playing* surface, said [puck member] *game piece* having a [diameter] *maximum* dimension.

16. The table game of claim 15, said paddle member comprising:

a first paddle extending upwardly transverse to said [top] *playing* surface; and a second paddle extending upwardly transverse to said [top] *playing* surface, said first and second paddles being in coplanar alignment, said first and second paddles having a space therebetween greater than said [diameter] *maximum* dimension of said [puck member] *game piece.*

17. The table game of claim 8, said vertical member extending through a slot in said housing, said slot defining a slidable travel path for said vertical member, said vertical member having a crossbar affixed to an end of said vertical member above said slot, said handle member comprising:

a first vertical handle affixed to one end of said crossbar; and a second vertical handle affixed to an opposite end of said crossbar.

18. The table game of claim 8, further comprising:

a transmission means connected to said handle and to said paddle member, said transmission means for rotating said paddle member relative to a rotation of said handle member.

19. The table game of claim [1, said housing having] *8, further comprising:* a trough means formed adjacent an end of said playing surface[, said table game comprising:]*; and* a ball rollably positioned on said playing surface, said trough means for receiving said ball when said ball passes by said paddle means.

20. The table game of claim 19, said trough means connected to a ball return tube, said tube extending from said trough to an opposite end of said playing surface.

*21. The table game of claim 8, said bar being a rail.*

*22. The table game of claim 8, further comprising a pair of said bars disposed parallel to one another.*

*23. The table game of claim 22, said bars being disposed generally parallel to the top surface of said playing surface.*

*24. The table game of claim 8, said playing surface being at a fixed incline.*

*25. A table game, comprising:*

*a housing;*

*a playing surface received within said housing;*

*a game piece slidably and removably positioned on said playing surface, said game piece having a diameter dimension; and*

*a paddle mechanism comprising:*

*a frame positioned at an end of said playing surface and extending above said playing surface;*

*at least one bar extending across said frame;*

*a paddle member comprising;*

*a first paddle extending upwardly transverse to said playing surface:*

*a second paddle extending upwardly transverse to said playing surface, said first and second paddles being in coplanar alignment, said first and second paddles having a space therebetween greater than said diameter dimension of said game piece;*

*a vertical member connected to said paddle member and rotatably and slidably connected to said bar to permit said paddle member to rotate about an axis generally perpendicular to said playing surface while moving across said playing surface; and*

*a handle member affixed to said vertical member.*

*26. The table game of claim 25, said playing surface being at a fixed incline.*

*27. The table game of claim 25, said game piece being a ball.*

*28. The table game of claim 27, further comprising a trough formed adjacent an end of said playing surface for receiving said ball when said ball passes by said paddle mechanism.*

*29. The table game of claim 28, said being connected to a ball return tube, said tube extending from said trough to a ball collection receptacle.*

*30. A table game, comprising:*

*a housing;*

*a playing surface received within said housing; and*

*a paddle mechanism comprising:*

*a frame positioned at an end of said playing surface and extending above said playing surface;*

*at least one bar extending across said frame;*

*a paddle member;*

*a vertical member connected to said paddle and rotatably and slidably connected to said bar to permit said paddle member to rotate about an axis generally perpendicular to said playing surface while moving across said playing surface; and*

*a handle member affixed to said vertical member, said vertical member extending through a slot in said housing, said slot defining a slidable travel path for said vertical member, said vertical member having a crossbar affixed to an end of said vertical member, said handle member comprising:*

*a first vertical handle affixed to one end of said crossbar; and*

*a second vertical handle affixed to an opposite end of said crossbar.*

*31. The table game of claim 30, said vertical handles being rotatably connected to said crossbar.*

*32. The table game of claim 30, said playing surface being at a fixed incline.*

*33. A paddle mechanism for propelling a game piece across a playing surface, comprising:*

*a frame for positioning above said playing surface;*

*at least one bar extending across said frame;*

*a paddle member;*

*a vertical member connected to said paddle member and rotatably and slidably connected to said bar to permit said paddle member to rotate about an axis generally perpendicular to said playing surface while moving across said playing surface; and*

*a handle member affixed to said vertical member.*

*34. A paddle mechanism for propelling a game piece across a playing surface, comprising:*

*a paddle member;*

*a frame for positioning adjacent said playing surface;*

*at least one bar extending across said frame;*

*a support member for holding and positioning said paddle member above said playing surface, said support member connected to said paddle member, movably connected to said bar for moving said paddle member along at least one dimension of said playing surface and rotatably connected to said bar for rotating said paddle member about an axis generally perpendicular to said playing surface; and*

*a handle member connected to said support member.*

*35. The paddle mechanism of claim 34, said handle member comprising a crossbar connected to an end of said support member, a first vertical handle connected to one end of said crossbar and a second vertical handle connected to an opposite end of said crossbar.*

*36. The paddle mechanism of claim 35, said vertical handles being rotatably connected to said crossbar.*

*37. The paddle mechanism of claim 34 further comprising a transmission means connected between said handle member and said paddle member, said transmission means for rotating said paddle member relative to rotation of said handle member.*

*38. The paddle mechanism of claim 34, which comprises at least two bars extending across said frame.*

*39. The paddle mechanism of claim 34, said paddle member further comprising:*

*a first paddle extending upwardly transverse to said playing surface: and*

*a second paddle extending upwardly transverse to said playing surface, said first and second paddles being in coplanar alignment, said first and second paddles having a space therebetween through which said game piece may pass.*

* * * * *

UNITED STATES PATENT AND TRADEMARK OFFICE

CERTIFICATE OF CORRECTION

PATENT NO. : RE 37,451 E
DATED : November 20, 2001
INVENTOR(S) : Jose Javier Silva Guridi It is certified that error appears in the above-identified patent and that said Letters Patent is hereby corrected as shown below:

Claim 29,
Line 1, after "said," please insert -- trough --.

Signed and Sealed this

Second Day of April, 2002

*Attest:*

*Attesting Officer*

JAMES E. ROGAN
*Director of the United States Patent and Trademark Office*